US012574711B2

(12) United States Patent
Robinson

(10) Patent No.: US 12,574,711 B2
(45) Date of Patent: Mar. 10, 2026

(54) UTILIZING IPSM GATEWAY FOR DELIVERY UNIFICATION AND DOMAIN SELECTION

(71) Applicant: Boost SubscriberCo L.L.C., Englewood, CO (US)

(72) Inventor: Xiaowen Robinson, Englewood, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 431 days.

(21) Appl. No.: 18/091,690

(22) Filed: Dec. 30, 2022

(65) Prior Publication Data

US 2024/0224003 A1 Jul. 4, 2024

(51) Int. Cl.
*H04W 4/14* (2009.01)
*H04W 8/10* (2009.01)

(52) U.S. Cl.
CPC .............. *H04W 4/14* (2013.01); *H04W 8/10* (2013.01)

(58) Field of Classification Search
CPC ......... H04W 4/12–14; H04W 8/08–14; H04W 88/16; H04W 92/00–06; H04W 12/00–069; H04M 3/42382; H04M 7/0042–0054; G06F 21/30–46
See application file for complete search history.

(56) References Cited

U.S. PATENT DOCUMENTS

2011/0134843 A1* 6/2011 Noldus ............... H04L 65/1095
370/328

2015/0023162 A1* 1/2015 Alisawi ................. H04W 76/10
370/230
2015/0358789 A1* 12/2015 Bendi ..................... H04W 4/14
455/466

FOREIGN PATENT DOCUMENTS

EP 1985130 B1 * 9/2016 .............. H04W 8/06
WO WO 2009142473 A1 11/2009

OTHER PUBLICATIONS

International Search Report & Written Opinion, dated Apr. 4, 2024, for International Patent Application No. PCT/US2023/082106. (14 pages).

* cited by examiner

*Primary Examiner* — Ronald Eisner
(74) *Attorney, Agent, or Firm* — Seed Intellectual Property Law Group LLP

(57) ABSTRACT

Various embodiments of apparatus, systems and/or methods are described for processing SMS messages using a gateway server (IP-SM-GW). The IP-SM-GW includes a processor, multiple interfaces, and at least one module. These interfaces are configured to receive a short message service (SMS) message from one of a plurality of different networks comprising LTE, 2G/3G and 5G. The module is configured to determine which of the networks the SMS message originated from; query the subscriber database based on the UE identifier in the MO SMS message; validate the SMS message; and in response to the result of validating the SMS message, sending the SMS message to a short message service center server (SMSC) for delivery or rejecting the SMS message for deposit. The IP-SM-GW also is configured to select and send the SMS message to the proper domain.

13 Claims, 8 Drawing Sheets

UTILIZING IPSM GATEWAY FOR DELIVERY UNIFICATION AND DOMAIN SELECTION

BACKGROUND

Currently, mobile phone users send short message service (SMS) messages to each other using cellular networks. However, the networks use a range of different generational networks, such as 2G, 3G, 4G, and 5G, with different interfaces and capabilities for each network. Moreover, each provider may have partner networks that coordinate together to share network services.

However, because there are so many different networks, there are various different interfaces required to interface with each other so that the SMS messages can be routed properly. Thus, if a user is on a 5G network, it is complicated (or maybe even not possible) to receive messages originating from a 3G network.

Moreover, international 2G/3G SMS messaging cannot be validated against subscriber service subscription.

SUMMARY

Generally, according to some embodiments, described herein are various embodiments of apparatus, systems and/ or methods for processing multiple SMS messages coming from various domains all using a common gateway server (IP-SM-GW) for sending mobile originating (MO) or mobile terminating (MT) SMS messages, and also the IP-SM-GW is configured to select and send the SMS message to the proper domain once validated.

According to one embodiment, a method is provided for processing SMS messages using a gateway server (IP-SM-GW). The IP-SM-GW includes a processor, an interface, and at least one module. The interface is configured to receive a short message service (SMS) message (Mobile Originating) from one of a plurality of different networks comprising LTE, 2G/3G and 5G. The module is configured to determine which of the networks the SMS message originated from; optionally, process the SMS message based on the determined network; validate the SMS message with a subscriber database; and in response to validating the SMS message, sending the SMS message to a short message service center server (SMSC) for delivery. In addition, the IP-SM-GW receives all the SMS terminated for the Service Provider's subscribers (Mobile Terminating), selects the proper network domain where the subscriber is current on based on predefined selection order, and deliver it to the recipient accordingly.

to another embodiment, a method for processing SMS messages is provided that is implemented in a gateway server (IP-SM-GW). The method includes receiving a short message service (SMS) message (Mobile Originating) from one of a plurality of different networks comprising LTE, 2G/3G and 5G; determining which of the networks the SMS message originated from; processing the SMS message based on the determined network; validating the SMS message with a subscriber database; and in response to validating the SMS message, sending the SMS message to a short message service center server (SMSC) for delivery. In addition, the IP-SM-GW receives all the SMS terminated for the Service Provider's subscribers (Mobile Terminating), selects the proper network domain where the subscriber is current on based on predefined selection order, and deliver it to the recipient accordingly.

According to another embodiment, a non-transitory storage medium of a gateway server (IP-SM-GW) stores instructions, that when executed by a processor performs a method. The method includes receiving a short message service (SMS) message (Mobile Originating) from one of a plurality of different networks comprising LTE, 2G/3G and 5G; determining which of the networks the SMS message originated from; processing the SMS message based on the determined network; validating the SMS message with a subscriber database; and in response to validating the SMS message, sending the SMS message to a short message service center server (SMSC) for delivery. In addition, the IP-SM-GW receives all the SMS terminated for the Service Provider's subscribers (Mobile Terminating), selects the proper network domain where the subscriber is current on based on predefined selection order, and deliver it to the recipient accordingly.

BRIEF DESCRIPTION OF THE DRAWINGS

The same number represents the same element or same type of element in all drawings.

DETAILED DESCRIPTION OF EMBODIMENTS

The various embodiments described herein generally provide apparatus, systems and methods for utilizing an IPSM gateway to provide unification of short message service and proper domain selection thereof.

This enables a simple cost-efficient network deployment with no need to deploy legacy network function independent of the core network evolution (e.g. 5G and beyond). Additionally, for roaming and interconnection scenarios, a major simplification and cost-efficient deployment with such a unified packet-based message delivery can be achieved.

Figure 1:
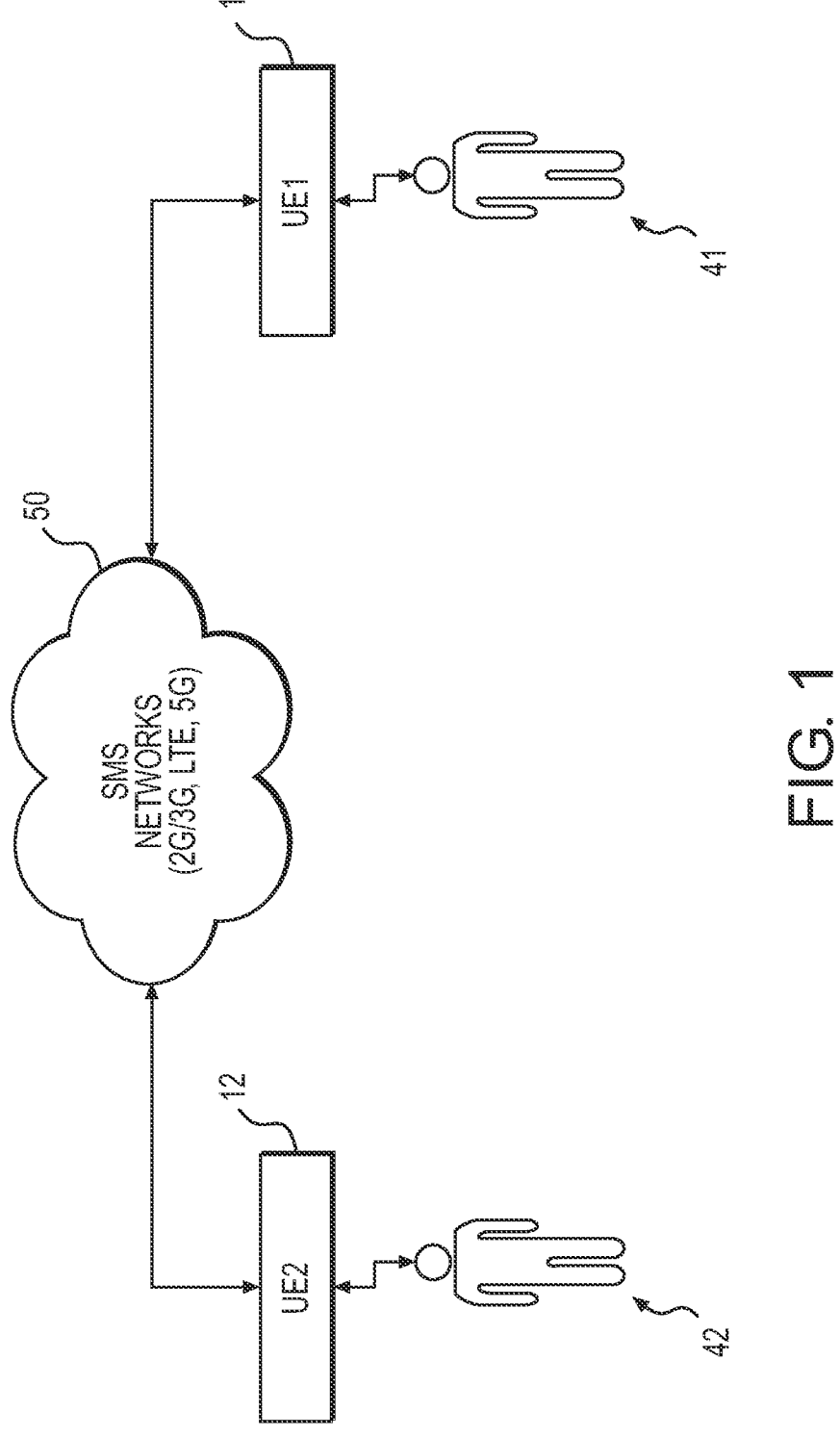
FIG. 1 illustrates an embodiment of a SMS system to deliver SMS messages between mobile devices, according to some embodiments.

As shown in FIG. 1, a user 41 with user equipment UE1 11 sends an SMS to user equipment UE2 of another user 42 over an SMS network 50.

As mentioned above, current SMS networks are not configured to handle SMS messages originating from different networks (5G, LTE, 2/3G, etc.) using various packet core network elements (MME, AMF, etc.). A unified SMS system (referred to herein as "USMS") is provided herein to address these issues.

The USMS can use any packet access and/or core network where a subscriber can register via home subscription server and/or other register databases. In such a network, a subscribed user equipment (UE) can receive and deliver short messages (e.g. SMS messages, IP based messages, unstructured data, OTA (over-the-air) messages, public warning messages (PWS) with standardized packet core technology using a common gateway and interface system). The system supports optimal message receive and message delivery including the message content via unified interfaces to/from the packet core network elements (e.g. MME, AMF, etc.). The USMS supports interworking with legacy (e.g. short message service center (SMSC)) and interworking with new messaging services (using application layer communication) as a gateway function with standard interfaces.

It should be noted that embodiments of the invention can be implemented in hardware and/or software.

In the following detailed description, reference is made to the accompanying drawings, which form part of the disclosure, and in which are shown, by way of illustration, exemplary aspects in which the present invention may be placed. Moreover, in the following, network entities are described such as network access entities and core network entities. The network access entity enables access and mobility management in the communication network. Via the network access entity, communication terminals with their identity (UE ID) can register in the communication network and receive the permission to set up a communication connection. For example, in the 5G communication network, the network access entity may be an Access and Mobility Management Function (AMF) representing the access and mobility management function. This manages the access and mobility control. The AMF may also include network slice selection functionality.

The network access entity may be, for example, a mobility management entity (MME) in the 4G LTE communication network. The MME is a network component of the Long Term Evolution (LTE) mobile radio standard, which performs the functions of paging to set up calls and generally communication links as well as signaling for control purposes. The MME forms the link between core network and access network. The MME manages the locations of all mobile communication terminals in the radio cells connected to it. In the LTE system, several cells are usually combined to form a tracking area. The management area of an MME can be divided into several tracking areas.

The radio access network (RAN) is part of a mobile telecommunication system. The RAN resides between a device such as a mobile phone, a computer, or any remotely controlled machine and the core network. Depending on the standard, mobile phones and other wireless connected devices are varyingly known as user equipment (UE), terminal equipment, mobile station (MS), etc. RAN functionality is typically provided by a RAN entity, e.g. a silicon chip, residing in both the RAN network as well as the user equipment.

Figure 2:
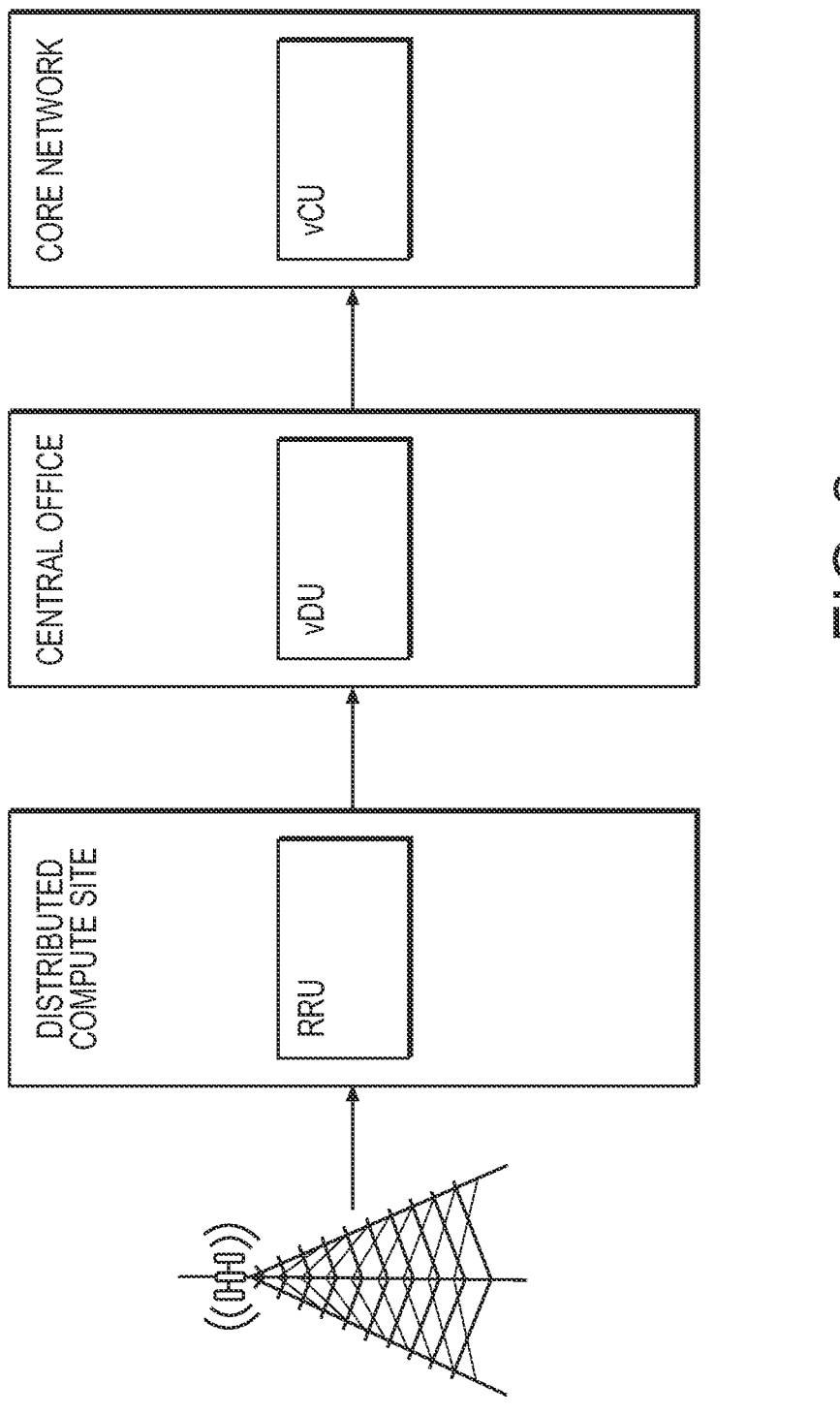
FIG. 2 illustrates an embodiment of a wireless cellular system, according to some embodiments.

The RAN includes a tower, radio unit (RU), distributed unit (DU), central unit (CU), and an element management system (EMS). FIG. 2 illustrates a system that delivers full RAN functionality using network functions virtualization (NFV) infrastructure. This approach decouples baseband functions from the underlying hardware and creates a software fabric. Within the solution architecture, virtualized baseband units (vBBU) process and dynamically allocate resources to remote radio units (RRUs or RUs) based on the current network needs. Baseband functions are split between central units (CUs) and distributed units (DUs) that can be deployed in aggregation centers or in data centers using a distributed architecture, such as using kubernetes clusters as discussed herein.

CUs and DUs (and virtualized CUs and DUs (vCUs and vDUs)) run as cloud-native network functions (CNFs) within the NFV infrastructure. The entire software stack that is needed is provided for NFV, including open source software. This software stack and distributed architecture increases interoperability, reliability, performance, manageability, and security across the NFV environment.

The RUs are mostly located at the cell sites and receives a digital signal(s) from the DUs which can be localized at the location of the RUs or in a central location. The RUs convert the digital signals to analog signals. The RUs then feed the analog signals into the antennas, which then broadcast these analog signals over the air to provide coverage in a specific area. The RUs operate over specific bands (low bands: 600 Mhz, 700 Mhz, 850 Mhz, mid-bands: 1710 MHz-1780 MHz and 1695 MHz-1710 MHz, etc.).

Figure 3:
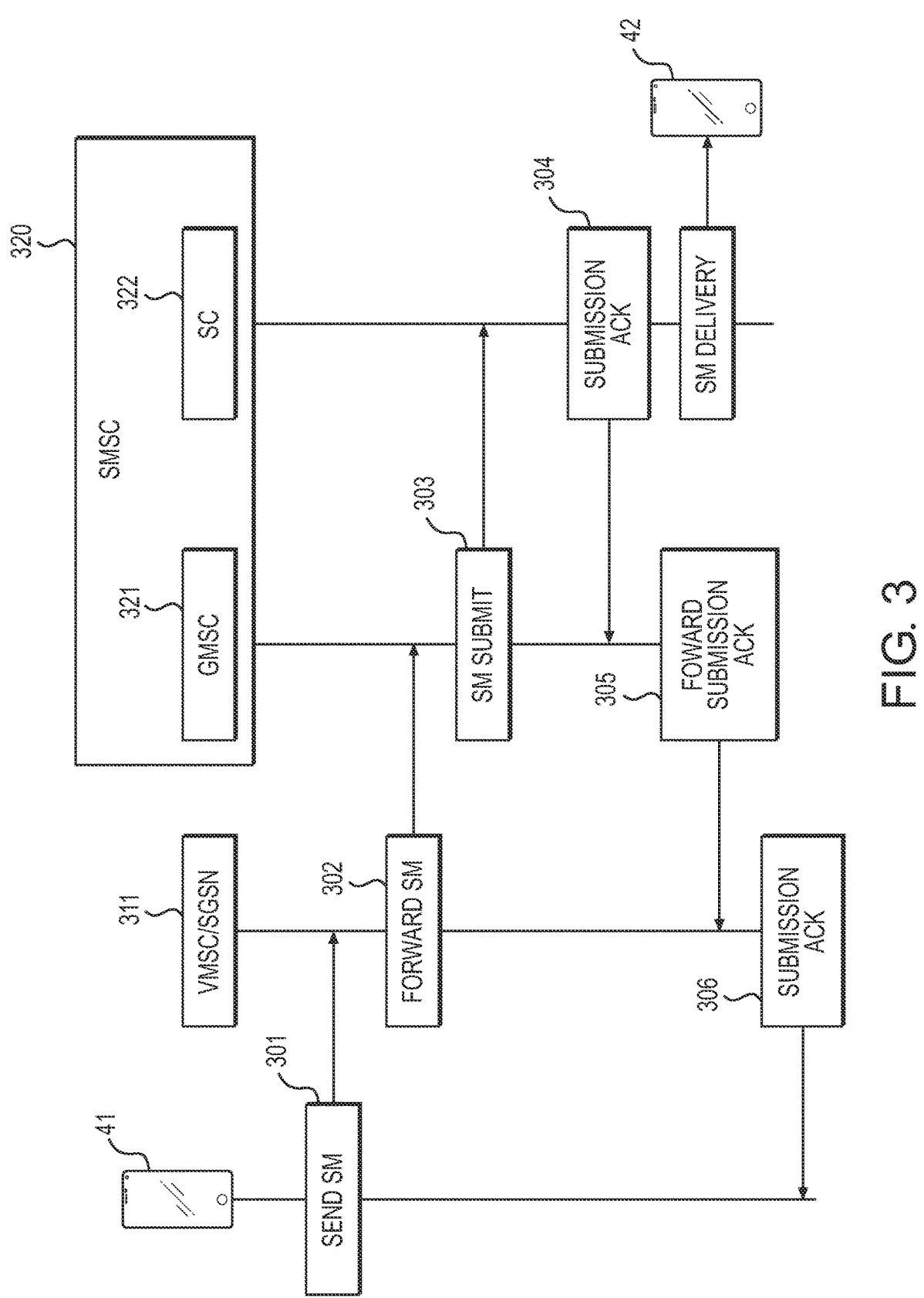
FIG. 3 illustrates a message sequence diagram illustrating common mobile-originated SMS messages.
Figure 4:
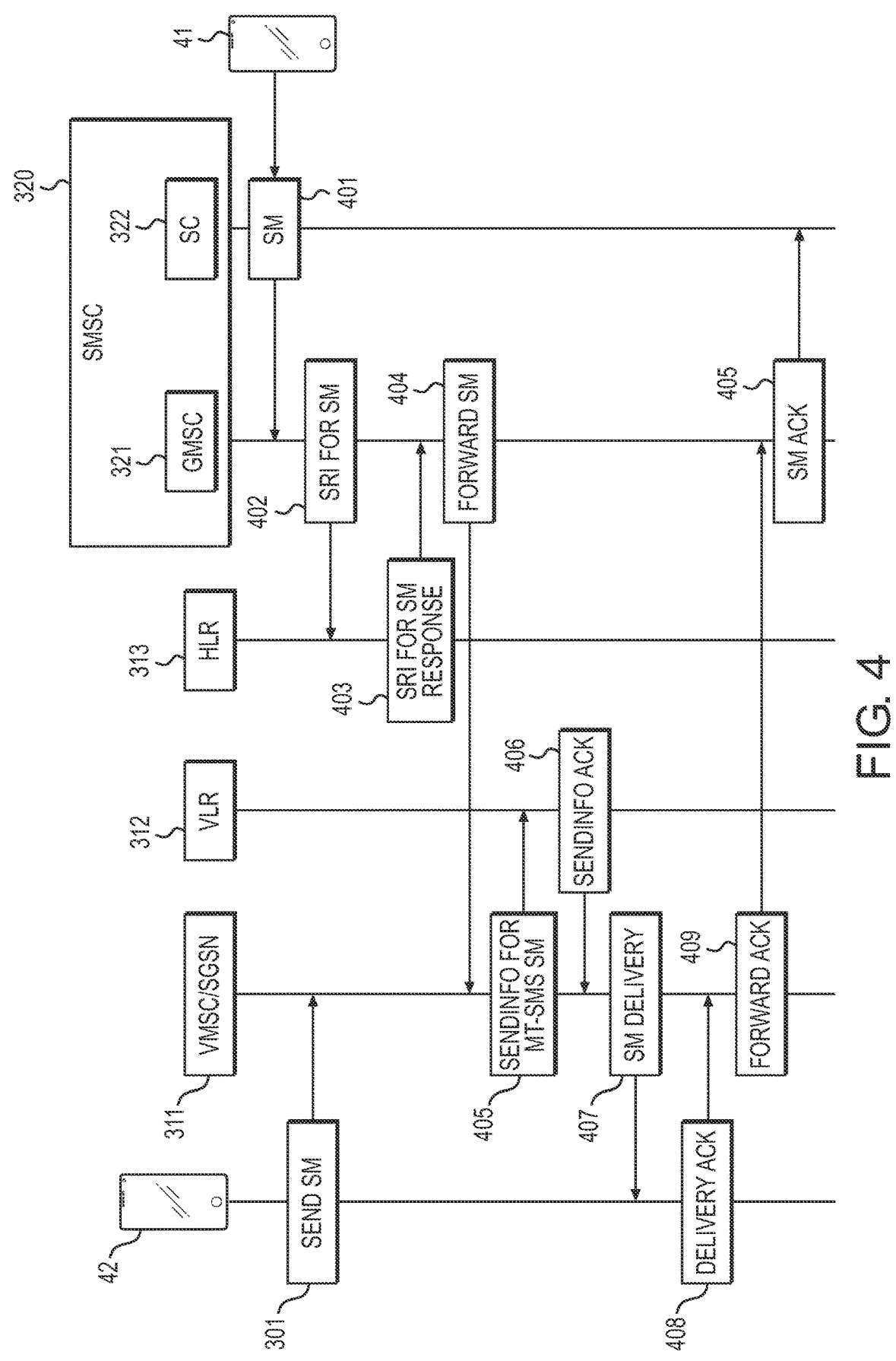
FIG. 4 illustrates a message sequence diagram illustrating common mobile terminated (MT) SMS messages.

FIG. 3 shows in 2/3G network a message sequence diagram 100 illustrating common mobile-originated SMS messages and FIG. 4 shows in 2/3G network a message sequence diagram 200 illustrating common mobile terminated (MT) SMS messages.

The SMS is realized by use of the Mobile Application Part (MAP) of the SS7 protocol, with short message (SM) protocol elements being transported across the network as fields within the MAP messages.

When the subscriber sends a SMS message (referred to herein as a SM), the handset 41 sends the message over the air interface to the MSC/SGSN 311, as shown in 301. Along with the actual text of the SM, the destination address of the SM and the address of the SMSC 320 are included, the latter taken from the UE's 41 configuration stored on the SIM card.

Regardless of the air interface technology, the VMSC/SGSN invokes the MAP service package to send the text to the Interworking MSC or Gateway MSC (GMSC) 321 of the Service Center (SC) 320 whose address was provided by the UE 41. This service sends the SM 302 MAP operation to the SMSC 320 identified in the SM Submission from the UE 41, embedded within a Transaction Capabilities Application Part (TCAP) message, and transported over the core network using the Signaling Connection Control Part (SCCP).

The Interworking MSC 321 of the SMSC 320, on receipt of the forwarded SM message 302, passes the SMS-PP Application Protocol Data Unit (APDU) containing the message 303 to the actual Service Center (SC) 322 of the SMSC 320 for storing, and subsequent "forwarding" (delivery) to the destination address and the SC 322 returns an acknowledgement 304 indicating success or failure. On receipt of this submission status from the Service Center 322, the Interworking MSC 321 will send an appropriate indication 305 back to the VMSC/SGSN 311 of the sending subscriber. The message submission status 306 is then forwarded, over the air interface, to the subscriber's UE 41.

In one embodiment, when the SMSC 320 determines it needs to attempt to deliver a short message 401 to its destination, it will send the SMS-PP APDU containing the message, the destination phone number and other details to the GMSC 321 logical component on the SMSC 320. The GMSC 321, on receipt of this short message 401, needs to discover the location of the destination phone number in order to be able to correctly deliver the text to the recipient (the term Gateway MSC, in this context, indicating an MSC that is obtaining routing information from the Home Location Register (HLR) 313). To do this, the GMSC 321 invokes the MAP service package, which sends a routing info request message 402 to the destination number's HLR 313, requesting their present location. This message 402 may be sent to an HLR 313 in the same network as the SMSC 320, or via an interconnect to an HLR 313 in a foreign PLMN, depending on which network the destination subscriber belongs to.

The HLR 313 performs a database lookup to retrieve the recipient's current location, and returns it in an acknowledgement message 403 to the SMSC's GMSC entity 321. The current location may be the MSC address the subscriber is currently roaming on, the SGSN address, or both. The HLR 313 may also return a failure, if it considers the destination to be unavailable for short messaging.

Having obtained the routing information from the HLR 313, the IP-SM-GW 620 will attempt to deliver the Short Message 401 to its recipient. This is done by invoking the a MAP forwarding service, which sends a MAP forward message 404 to the address returned by the HLR 313, regardless of whether it is an MSC (Circuit Switched SMS delivery) or an SGSN (Packet Switched SMS delivery) 311.

In one embodiment, once the SMS is delivered to the SMSC, the SMSC will query HLR for location of the recipient, the HLR will forward the query request to the IP-SM-GW, which sends query request to the HLR. Upon receiving the query response, the IP-SM-GW replies to the SMSC IP-SM-GW address so the SMSC can send the SMS to the IP-SM-GW 620, which further performs domain selection. In some embodiments, the GMSC might reside in the visiting network circuit switching i.e. 2G network.

The VMSC 311 will retrieve the subscriber information from the VLR 312, and such retrieval may include an authentication procedure. The VMSC 311 may also request and retrieve other information needed for it to deliver the short message 401 to its recipient by sending a send sub info retrieval message to the VLR 312. The VLR 312 will then instigate a page request, or subscriber search, for the destination subscribers Mobile Subscriber ISDN Number (MSISDN) and return the result 406 to the VMSC 311. Since a typical deployment sees the VLR 312 being co-located with the MSC 311, this message flow is usually internal to the platform. Should the page or search for the subscriber fail, the VLR 312 will indicate the failure cause to the VMSC 311, which will abort the Short Message delivery procedure and return the failure to the SMSC 311. If the page of the handset 310 was successful and Short Message delivery 407 was sent and Delivery Ack 408 from handset 310 received, the VMSC 311 will then send to the SMSC indicating successful delivery 409. The GMSC 321 component of the SMSC 320 passes the result 410 of the delivery attempt to the Service Center 322. In the case of successful delivery, the delivered text message will be removed from the Store and Forward Engine (SFE) and, if requested, a delivery report sent to the text originator. If the delivery failed, the SMSC 320 invokes a retry procedure to periodically make further attempts at delivery; additionally, it may register with the HLR 313 to receive a notification when the B-Party becomes available for Short Message delivery in the future.

As mentioned above, there are multiple different networks that UEs send SMS messages in different manner and have different systems and interfaces. For example, the networks in FIGS. 5A-5C shown below are all different as well as the interfaces.

Figures 5A, 5B:
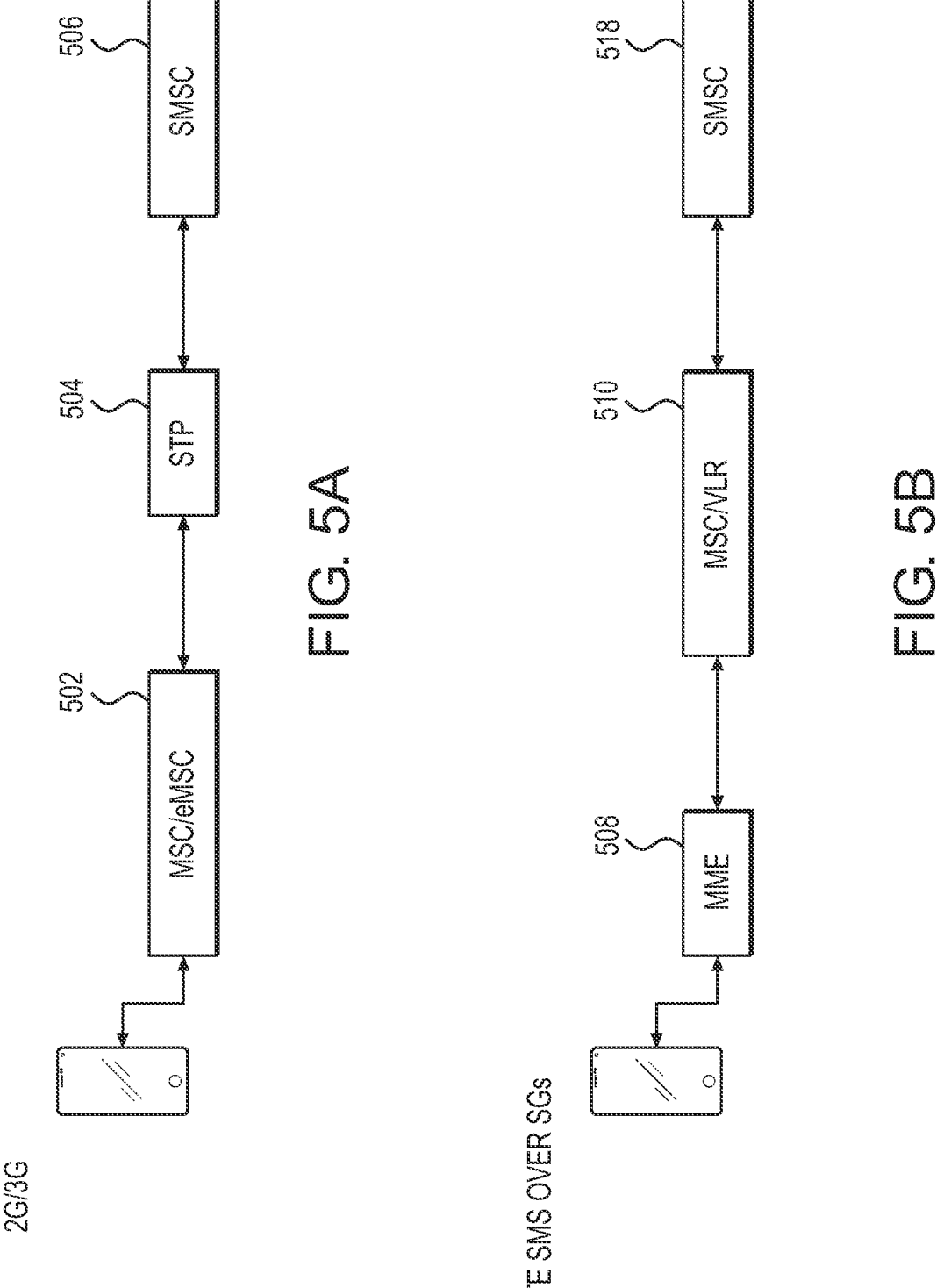
FIG. 5A illustrates a block diagram of an SMS system for 2G/3G according to some embodiments.
FIG. 5B illustrates a block diagram of an SMS system for LTE roaming according to some embodiments.
Figure 5C:
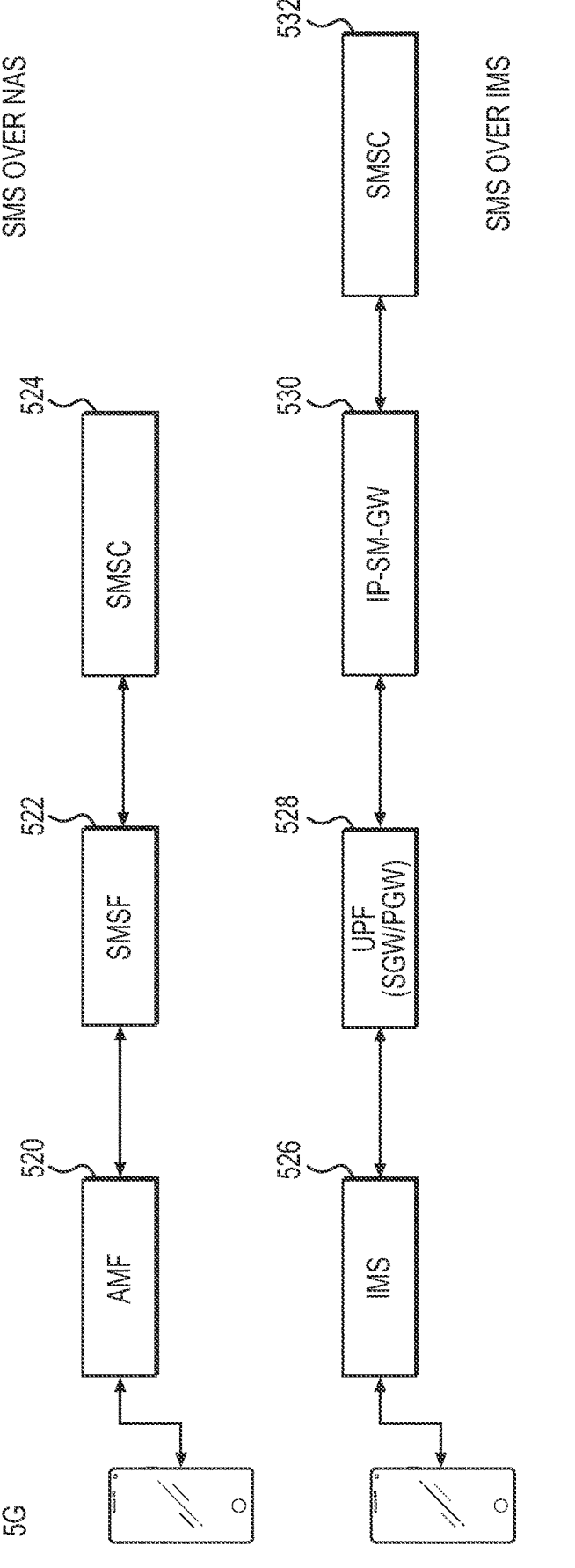
FIG. 5C illustrates a block diagram of an SMS system for 5G according to some embodiments.

FIG. 5A illustrates a block diagram of an SMS system for 2G/3G. As for the actual transmission of an SMS, the text message from the sending mobile device is stored in a separate channel called the short message service center (SMSC) 506, as explained above. The SMSC's primary job was forwarding messages to recipients and storing SMS messages if the recipient is not immediately available. In 2G/3G networks, messages are passed through the Enhanced Mobile Switching Center (eMSC) and base transceiver station parts of the network before ending up at the receiving device.

This is accomplished using a Signal Transfer Point (STP) 504. STPs 504 transfer messages between interconnected nodes (signaling end points (SEPs)) based on information contained in the address fields. Typical SEPs include service switching points (SSPs) and service control points (SCPs). The STP 504 may be connected to adjacent SEPs and STPs via signaling links.

The STP 504 supports any-to-any signaling connectivity between SS7 and IP SIGTRAN interfaces for maximum network integration flexibility. The STP 504 offers all the standard features and functionality expected of an STP solution, including Gateway Screening and Global Title Translation, while also offering extended capabilities and features such as Signaling Gateway and Point Code Emulation.

The STP 504 delivers the SM to the SMSC 505, which then forwards the SM to the recipient and stores the SMS message if the recipient is not immediately available.

In LTE, there are two ways to send SMS messages, as shown in FIG. 5B, including SMS over NAS and SMS over IMS. For SMS over NAS, if GERAN or UTRAN is deployed, the LTE system uses an SMSC 518 and an MSC 510, which uses circuit switch fallback to allow the SMS messages to go to the UE device and back again using the MME interface 508 (which is SGs interface). If GERAN or UTRAN is not deployed, SGd interface is used. The SMS message may be encapsulated in an NAS message and sent to the MME 508 in an evolved packet core. This can be done, for example, over an S1-C interface. In accordance with an embodiment, the MME 508 can transfer the SMS directly to the SMSC 518. In one example, a SS7-based interface (including Sigtran) can be utilized, such as, but not limited to, a Gd interface. In another example, a Diameter interface can be utilized to communicate between the MME 508 and the SMSC 518. In one aspect, the SMSC 518 can deliver the SMS to the destination UE, whenever the destination UE is available, and can receive a delivery report. The delivery report can include information indicating whether the SMS was delivered successfully or not. The delivery report can be sent directly to the MME 508 via an SS7-based interface or a Diameter interface. It can be appreciated that an interface component can be utilized to facilitate direct communication between the MME 508 and the SMSC 518. The MME 508 can send the delivery report over the S1-C interface.

In 5G, there are two ways to send SMS messages, as shown in FIG. 5C, including SMS over NAS and SMS over IP/IMS, which are explained below.

First, for SMS over NAS, the functionality of the MME in LTE has been replaced by an access mobility function (AMF) 520. In order to get SMS messages to the device in 5G, a short message service function (SMSF) 522 is also needed. The SMSF 522 will conduct subscription checking and perform a relay function between the device and the SMSC 524 through interaction with the AMF 520.

For SMS over IP/IMS, SMS is encapsulated in a SIP message and carried over IMS core network 526 to SMSC 532. The IP-SM-GW 620 is integrated with IMS core function as an application server, interfaces with 2/3G network on a MAP interface as well as HLR and SMSC, and also has Diameter interface with SMSF, MME for supporting SMS over NAS.

While the delivery of SMS messages includes more details than the above, it is noted that there are various interfaces and structures for sending and processing mobile originating (MO) SMS messages and mobile terminating (MT) SMS messages. Moreover, as mentioned above, there is no way for some network providers to authenticate messages originating on older networks. For example, for international roaming MO SMS messages, international providers might not support SMS international roaming on LTE or 5G networks, instead they can only use 2/3G networks. The below description describes a solution to these issues in a more efficient and effective platform, referred to below as Unified Short Message System (USMS).

Unified Short Message System (USMS)

Figure 6:
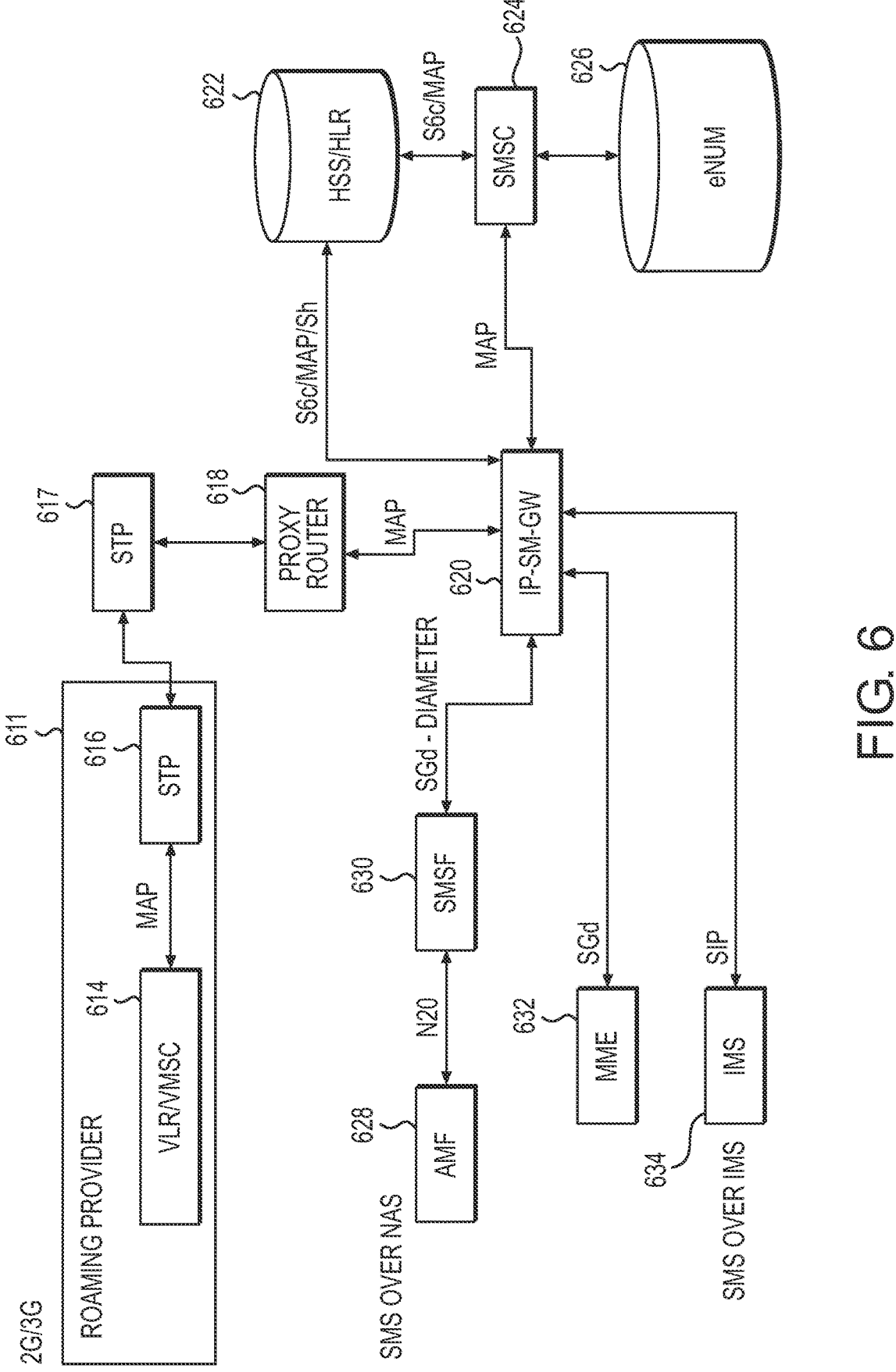
FIG. 6 illustrates a diagram illustrating a unified SMS system according to some embodiments.

FIG. 6 illustrates a diagram illustrating the USMS according to some embodiments. The USMS as provided herein provides unified SMS call processing. In short, all MO SMS messages over NAS (including both LTE and 5G), IMS or international 2G/3G systems are routed to a common IP-SM-GW 624 and then deposited from the IP-SM-GW 620 to the SMSC 624. The IP-SM-GW 620 validates the SC-address and the SMS subscription in MO SMS if not already done previously and based on the result, either routes the SMS message to the SMSC or rejects it. All of the on network MT SMS messages (i.e., all messages whose recipients are subscribed to the provider's network) are routed to the IP-SM-GW 620 for domain selection and delivery to simplify the interworking and routing among 2/3G, LTE, 5G, and IMS networks. Further details of these embodiments are described below and shown in FIG. 6.

In FIG. 6, the USMS system 600 can handle messages coming in via a 2G/3G route in the roaming provider (such as from a provider in a country outside of the US). When the message comes in through a VLR/VMSC 614 of the roaming partner 611, the Short Message Service is realized by the use of Mobile Application Part (MAP) of the SS7 protocol, with SM protocol elements being transported across the network as fields within the MAP messages. These MAP messages may be transported using traditional TDM based signaling, or over IP using SIGTRAN and an appropriate adaptation layer. An example of the MAP messages are shown in items 302 and 305 of FIG. 3.

Referring back to FIG. 6, the SMS messages are transported to a signal transfer point (STP) 616 of the roaming provider 611. STPs are nodes in an SS7 network that each routes signaling messages based on their destination point code in the SS7 network. Each STP works as a router that relays messages between signaling end-points (SEPs) and other signaling transfer points (STPs). Typical SEPs include service switching points (SSPs) and service control points (SCPs).

The STP 616 of the roaming provider 611 then communicates with an STP 617 of the end provider to transfer the message to the end provider. The STP 617 of the end provider then transmits the SM to the proxy router 618 which is configured to communicate using MAP to the IP-SM-GW 620. In this regard, the SMS message is routed properly through to the IP-SM-GW 620. Thus, in the USMS system 600, the SMS message goes to the IP-SM-GW 620 first for authorization prior to reaching the SMSC 624 as opposed to going directly from STP 617 to the SMSC 624.

Also, if an SMS message is sent via 5G over NAS (see FIG. 6), the AMF 628 receives the SMS and forwards it to the SMSF 630 using an N20 interface. The SMSF then communicates directly with the IP-SM-GW 620 to forward the SMS message to the IP-SM-GW 620.

For SMS over NAS for LTE roaming, the MME 632 receives the SMS message and then sends the message directly to the IP-SM-GW 620 using a SGd interface. The SGd interface enables the transfer of short messages between the MME and the SMSC using Diameter protocol and SCTP is used as the transport protocol.

Last, for SMS over IMS in 5G, the SMS messages come in through the IMS 634 and are sent directly to the IP-SM-GW 620 using a SIP interface. The SIP Interface is an application layer interface logically residing over a network interface. The SIP interface defines the transport addresses (IP address and port) upon which the IMS 634 receives and sends SIP messages to the IP-SM-GW 620.

As shown above, the IP-SM-GW 620 is configured to receive SMS messages from 2G/3G, SMS over NAS in LTE, SMS over NAS in 5G and SMS over IMS in 5G. Each of these configurations has different protocols and interfaces as explained above. However, the IP-SM-GW 620 is configured to have a system with a single network function to receive and process multiple SMS messages coming in via a plurality of different protocols and interfaces, as is explained in FIG. 7. In this regard, the IP-SM-GW 620 is a single focal point, supports multiple domains/technologies to work with multiple different interfaces and protocols, and has intelligence to authorize the SMS messages as well and perform domain selection.

Once the SMS messages are received at the IP-SM-GW 620, the IP-SM-GW 620 converts the SMS message into MAP protocol so that the SMSC 624 will only receive messages in a single protocol and only needs one network function to process the SMS messages coming in from different domains/networks/interfaces. The IP-SM-GW 620 also authenticates the SMS message using a Home Subscriber Server (HSS) and/or a Home Location Register (HLR) 622. The HSS/HLR 622 is a master database that stores user profiles, performs authentication and authorization of the user, and provides information about the physical location of the user. If the UE identity (e.g., phone number, user ID, etc.) of the sender/receiver of the SMS message has an SMS subscription in the HSS/HLR 622, then the sender/receiver is a subscriber for that provider and is authorized to send/receive the SMS message. As such, the IP-SM-GW 620 verifies that the sender of the SMS is a subscriber of the network and is authorized to send the SMS message on the provider's network. If so, the SMS message is validated then it is passed to the SMSC 624; otherwise the SMS message is rejected by the IP-SM-GW 620.

Moreover, the IP-SM-GW 620 determines which network the subscriber is on and whether the sender is roaming or not.

Once the SMSC 624 receives the SMS message, it then will process the SMS message for delivery and the SMSC 624 selects the domain to send the SMS message. To assist with the routing of SMS messages, an eNUM database 626 may be used to determine whether the recipient belongs to the provider, i.e., whether on-network (homed to the provider's network) or off-network (homed to other providers' networks). For example, if the SMS message is to be sent to a user of X provider and the sender of the SMS message is a subscriber to X provider, this means that the recipient is on-network. By way of another example, if the SMS message is to be sent to a user of X provider but the sender of the SMS message is a subscriber to Y provider, this means that the recipient is off-network.

The eNUM database 626 uses the Internet DNS system to translate E.164 (i.e. ordinary) telephone numbers into IP addressing schemes (like SIP, H323 or Email). In this regard, the eNUM system can map a particular number referred to as an E.164 number to one or more uniform resource identifiers (URIs) in the DNS. URIs are strings of characters that identify resources, such as documents, images, files, databases, e-mail addresses, websites or other resources or services in a common structured format. A URI can include among other things a SIP URI, an instant messaging (IM) identifier, an e-mail address identifier, an Internet chat session identifier, and an IP address.

Accordingly, if the recipient is an off-net subscriber, i.e. belongs to a different service provider that the UE subscribes to, the SMSC 624 can use the phone number (or other UE identifier) of the SMS recipient to then route the authorized SMS message to the recipient's service provider's network via SMSGW as described above in FIGS. 3-4. If the recipient is an on-net subscriber, i.e. belongs to the Service Provider, the SMSC 624 is configured to communicate with the HSS/HLR 622 to determine which network the recipient is on so that it can know which network to send and to route the SMS message properly via IP-SM-GW.

Thus, as shown above, all MO SMS over NAS, over IMS and over international 2/3G networks are routed only and directly to the IP-SM-GW 620 and then, if validated, are deposited to the SMSC 624 for delivery.

Accordingly, all on-net MT SMS messages are routed to the IP-SM-GW 620 for domain selection and delivery to simplify the interworking and routing among 2/3G, LTE, 5G and IMS networks.

Figure 7:
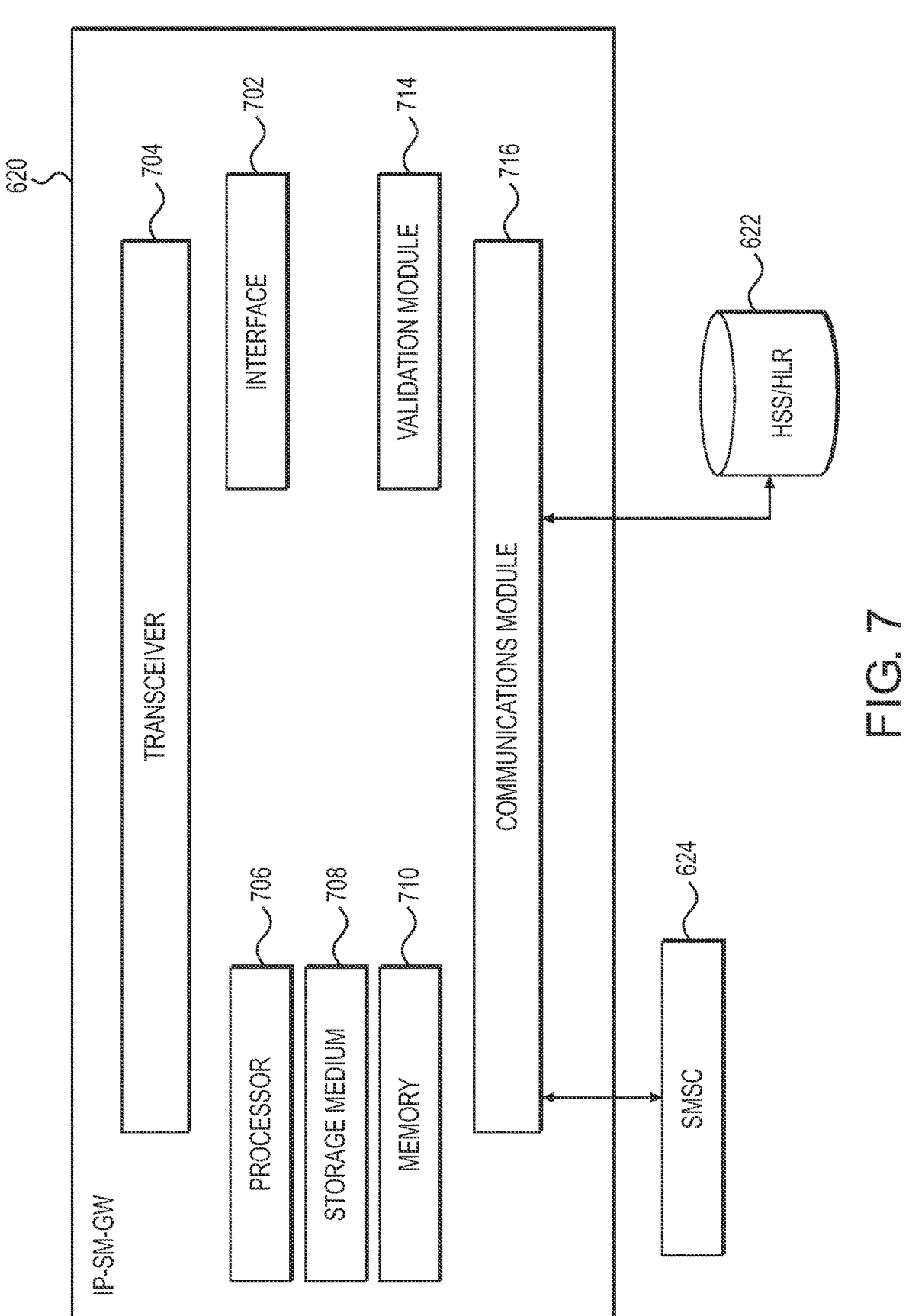
FIG. 7 illustrates the IP-SM-GW of the unified SMS system of FIG. 6, according to some embodiments.

FIG. 7 illustrates the IP-SM-GW 620 of the unified SMS system of FIG. 6, according to some embodiments.

The IP-SM-GW 620 includes a processor 706 for processing information and executing instructions or operations. The processor 706 may be any type of general or specific purpose processor. While a single processor 706 is shown in FIG. 7, multiple processors may be utilized according to other embodiments. In fact, the processor 706 may include one or more of general-purpose computers, special purpose computers, microprocessors, digital signal processors ("DSPs"), field-programmable gate arrays ("FP-GAs"), application-specific integrated circuits ("ASICs"), and processors based on a multi-core processor architecture, as examples.

The IP-SM-GW 620 further includes a memory 710 and storage medium 708, coupled to the processor 706, for storing information and instructions that may be executed by processor 22. The memory 710 and storage medium 708 may be one or more memories/storage mediums and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 710 and storage medium 708 can be comprised of any combination of random access memory ("RAM"), read only memory ("ROM"), static storage such as a magnetic or optical disk, or any other type of non-transitory machine or computer readable media. The instructions stored in the memory 710 and storage medium 708 may include program instructions or computer program code that, when executed by processor 706, enable the IP-SM-GW 620 to perform tasks as described herein.

The IP-SM-GW 620 is configured to communicate via an IP or circuit switched network for transmitting and receiving signals and/or data to and from the IP-SM-GW 620. In one embodiment, the IP-SM-GW 620 may further include a transceiver 704 that is capable of transmitting and receiving signals or data directly. For example, the transceiver 704 is configured to send and receive data between the MME 632, IMS 634, SMSF 630, proxy router 618, etc. Also, as the IP-SM-GW 620 supports multiple protocols, it has the capability of converting the SMS in one format to another, e.g. between SIP and MAP, Diameter and MAP, etc.

The processor 706 may perform functions associated with the operation of the IP-SM-GW 620 including, without limitation, any of the operations discussed in FIGS. 3-6, such as encoding and decoding of individual bits forming a communication message, formatting of information, and overall control of the IP-SM-GW 620, including processes related to management of communication resources.

In an embodiment, the memory 710 stores software modules that provide functionality when executed by the processor 706. The modules may include an operating system that provides operating system functionality for the IP-SM-GW 620. The memory 710 may also store one or more functional modules 714, 716, such as an application or program, to provide additional functionality for the IP-SM-GW 620. The components of the IP-SM-GW 620 may be implemented in hardware, or as any suitable combination of hardware and software.

In one embodiment, the IP-SM-GW 620 is illustrated in FIG. 7 as the IP-SM-GW 620 of FIGS. 3-6 discussed above, but it should be noted that the IP-SM-GW in FIG. 7 should not be limited to these embodiments and can include other or different features than the IP-SM-GW 620 described above. FIG. 7 is described with regard to the IP-SM-GW 620 for ease of illustration.

Regardless, the IP-SM-GW 620 includes a validation module 714 which performs the validation steps mentioned above including providing queries to the HSS/HLR 622 to determine if the sender is a subscriber of the provider's network and has SMS subscription. This is completed by checking if the sender's identification number is in the HSS/HLR database and whether it has the SMS service provisioned. If a positive match is determined, then the validation module 714 determines that the sender is validated; otherwise, the validation module 714 determines that the sender is not validated.

If the validation module 714 determines that the sender is validate, then the validation module 714 deposits the SMS message to the SMSC 624 as explained above, but does this through a communication module 716 (discussed below).

Also, the IP-SM-GW 620 includes a communication module 716. The communication module 716 performs various tasks including various communications to and from the IP-SM-GW 620. One function of the communication module 716 is to interface with any of the network messages sent to the IP-SM-GW 620, to determine which network protocols/interfaces the messages are coming from, and to convert the messages to MAP messages for sending to the SMSC 624. To do this, the communication module 716 will automatically recognize the incoming format of the message received. For example, if the message is being received has a format corresponding to SIP formatting, the communication module 716 will automatically recognize this, understand that the message is being sent by SMS over IMS and process the message according to such protocol. Once the message is received and deciphered, the message is then checked on the HSS/HLR for validation purposes. If validated, the communication module 716 will then convert the message to MAP formatting and send it to the SMSC 624 for delivery.

If the message is being received has a format corresponding to MAP formatting, the communication module 716 will automatically recognize such formatting, understand that the message is being sent by SMS over 2/3G and process the message according to such protocol. Once the message is received and deciphered, the message is then checked on the HSS/HLR for validation purposes.

If the message is being received has a format corresponding to SGd-Diameter formatting, the communication module 716 will automatically recognize this, understand that the message is being sent by SMS over NAS (LTE or 5G) and process the message according to such protocol. Once the message is received and deciphered, the message is then checked on the HSS/HLR for validation purposes.

In this regard, the communications module 716 includes a support for multiple technologies using a single network function that is configured to recognize and communicate with multiple other interfaces depending on the network the SMS message is originating from. In this regard, only a single focal point is needed to receive and validate SMS messages received from 2/3G, SMS over NAS (LTE or 5G), or SMS over IMS (5G), which would add complexity before the present application.

It should be noted that the delivery of the SMS message to the mobile terminal (MT) (i.e., on the MT side), the IP-SM-GW 620 performs domain selection for the SMS message so that the SMSC always sends the SMS to the IP-SM-GW for SMS delivery to the MT. This is shown using the HSS/HLR 622 where the domain for the MT is determined and then sent to the IP-SM-GW 620, which will then format the SMS message using the domain that the MT has registered in the HSS/HLR 622. For example, if the MT is registered in the HSS/HLR 6223 as SMS over NAS for 5G, the SMSC will notify the SMSC 624 of such domain and will select the protocols and servers to transmit the SMS message. Once the protocols are determined, the IP-SM-GW 620 performs the necessary processing (e.g., data conversion, interface selection, etc.) required for delivering the SMS to the domain of the MT indicated by the SMS sent by the MO.

In this regard, the SMSC 624 queries ENUM 626 to determine the recipient is on-network vs off-network. If the recipient is determined to be off-network, the SMSC 624 sends the SMS to a SMSGW (i.e., a third party broker) via which the SMS is sent to the recipient home SMSC; if the recipient is determined to be on-network, the SMSC 624 queries the HLR 622, and the HLR 622 forwards the query to IP-SM-GW 620, which queries the HLR 622 to validate whether the recipient has SMS service and to determine which network the recipient is currently on. If no SMS service subscription is determined from the query of the IP-SM-GW 620, the IP-SM-GW 620 responds to the SMSC 624 with error and the SMS will not be delivered, otherwise the IP-SM-GW 620 responds to SMSC 624 with the IP-SM-GW address on a SRI-SM Response message. Upon receiving the response, the SMSC 624 sends the SMS to the IP-SM-GW 620 for domain selection and corresponding SMS delivery. In this regard, the IP-SM-GW 620 performs both domain selection and the processing of incoming SMS messages from any domain as a one-stop network function.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A gateway server (IP-SM-GW) comprising:
at least one processor; and
at least one interface operational by the at least one processor and configured to:
receive a short message service (SMS) message from one of a plurality of different networks comprising LTE, 2G/3G and 5G; and
at least one memory coupled to the at least one processor, the memory having computer-executable instructions stored thereon that, when executed by the at least one processor, cause the gateway server to:
determine which of the networks the SMS message originated from;
validate the SMS message with a subscriber database; and
in response to validating the SMS message, sending the SMS message to a short message service center server (SMSC) for delivery.

2. The gateway server of claim 1, wherein the gateway server is disposed between the different networks and the SMSC so that the SMS message is intercepted at the gateway server prior to reaching the SMSC.

3. The gateway server of claim 1, wherein the subscriber database comprises an HSS/HLR database, and wherein the computer-executable instructions, when executed by the at least one processor, further cause the gateway server to:
query the HSS/HLR database based a identifier of a user equipment (UE) of a mobile originating (MO) SMS;
determine a response to the query to determine if the UE identifier exists in the HSS/HLR database and if the UE identifier is associated with a SMS subscription; and
if the UE identifier exists in the HSS/HLR database with the SMS subscription the SMS message is validated.

4. The gateway server of claim 3, wherein in response to validating the SMS message the IP-SM-GW selects a domain associated with a recipient the SMS message is intended for and sends the SMS to such domain.

5. The gateway server of claim 1, the interface is further configured to:
receive a first SMS message via SMS over IMS on an LTE network via a Serving and PDN Gateway (S/PGW) and IMS via Session Initiation Protocol (SIP);
receive a second SMS message via SMS over NAS on a 5G network via an Access and Mobility Management Function (AMF) via SGd protocol; process the first SMS message and the second SMS message both using the IP-SM-GW to determine the first SMS message was sent with the SIP and the second SMS message was sent by SGd protocol;
convert the first SMS message and the second SMS message to a common format; and

forward the first SMS message and the second SMS message in the common format to the SMSC.

6. The gateway server of claim 5, the IP-SM-GW is further configured to:
receive a third SMS message on a 2G/3G network via an MAP interface;
process the third SMS message using the interface to determine the third SMS message was sent with the MAP interface;
convert the third SMS message to the common format if necessary; and
forward the third SMS message in the common format to the SMSC.

7. The gateway server of claim 1, wherein the computer-executable instructions, when executed by the at least one processor, further cause the gateway server to:
in response to not validating the SMS message, either a user equipment (UE) does not exist in service provider's subscriber database or the UE does not have a SMS subscription, rejecting the SMS message and preventing the SMS message from being sent to the SMSC for delivery.

8. A non-transitory storage medium of a gateway server (IP-SM-GW), the non-transitory storage medium storing instructions, that when executed by a processor cause the gateway server to perform a method comprising:
receiving a short message service (SMS) message from one of a plurality of different networks comprising LTE, 2G/3G and 5G;
determine which of the networks the SMS message originated from;
validating the SMS message with a subscriber database; and
in response to the validated SMS message, sending the SMS message to a short message service center server (SMSC) for delivery.

9. The non-transitory storage medium of claim 8, wherein the gateway server is disposed between the different networks and the SMSC so that the SMS message is intercepted at the gateway server prior to reaching the SMSC.

10. The non-transitory storage medium of claim 8, wherein the subscriber database comprises an HSS/HLR database, and wherein the method further comprises:
querying the HSS/HLR database based on an identifier of user equipment (UE) in a mobile originating SMS;
checking a query response to determine if the UE exists in the HSS/HLR database and if the UE has SMS subscription service; and
if the UE identifier exists in the HSS/HLR database with the SMS subscription, validating the SMS message.

11. The non-transitory storage medium of claim 8, wherein the method further comprises converting the SMS message to a format usable by the SMSC.

12. The non-transitory storage medium of claim 8, wherein the method further comprises:
receiving a first SMS message via SMS over IMS on an LTE network via a serving gateway/PDN gateway (S/PGW) and IMS via Session Initiation Protocol (SIP);
receiving a second SMS message via SMS over NAS on a 5G network via an Access and Mobility Management Function (AMF) via SGd protocol; processing the first SMS message and the second SMS message both using the IP-SM-GW to determine the first SMS message was sent with the SIP and the second SMS message was sent by SGd protocol;

converting the first SMS message and the second SMS
message to a common format; and forwarding the first SMS message and the second SMS
message in the common format to the SMSC.

13. The non-transitory storage medium of claim 8,
wherein the method further comprises:

receiving a third SMS message on a 2G/3G network via
MAP interface;

processing the third SMS message using the interface to
determine the third SMS message was sent with the
MAP interface;

converting the third SMS message to the common format;
and forwarding the third SMS message in the common format
to the SMSC.

* * * * *